United States Patent
Louko

(10) Patent No.: US 10,806,218 B1
(45) Date of Patent: Oct. 20, 2020

(54) METHOD FOR MANUFACTURING A CUSTOMIZED INSOLE AND A SYSTEM THEREFOR

(71) Applicant: Singularitatem Oy, Helsinki (FI)

(72) Inventor: Patrik Louko, Helsinki (FI)

(73) Assignee: Singularitatem Oy, Helsinki (FI)

( * ) Notice: Subject to any disclaimer, the term of this patent is extended or adjusted under 35 U.S.C. 154(b) by 0 days.

(21) Appl. No.: 16/706,130

(22) Filed: Dec. 6, 2019

(51) Int. Cl.
| | |
|---|---|
| *A43D 1/02* | (2006.01) |
| *B29D 35/12* | (2010.01) |
| *A43B 17/00* | (2006.01) |
| *G06T 17/00* | (2006.01) |
| *G01B 11/24* | (2006.01) |
| *B33Y 50/00* | (2015.01) |
| *A43B 7/14* | (2006.01) |

(52) U.S. Cl.
CPC .............. *A43D 1/025* (2013.01); *A43B 17/00* (2013.01); *B29D 35/12* (2013.01); *G01B 11/24* (2013.01); *G06T 17/00* (2013.01); *A43B 7/1415* (2013.01); *B33Y 50/00* (2014.12)

(58) Field of Classification Search
CPC ..... G06T 19/20; G06T 17/00; G06T 2215/16; A43B 3/0005; A43B 17/00; A43B 5/02; A43B 19/00; A43B 1/02; A43B 3/02; A43B 7/04; A43B 1/0054; A43B 3/0015; A43B 3/0026; A43B 7/02; A43B 3/26; A43D 1/02; H04N 13/275; A61B 5/6829; A61B 5/1074; G05B 2219/49023; A45D 2044/007; G06K 9/00664; G06K 9/2018
USPC ................ 382/141; 126/146, 262; 36/29, 88
See application file for complete search history.

(56) References Cited

U.S. PATENT DOCUMENTS

| | | | | |
|---|---|---|---|---|
| 5,404,658 | A * | 4/1995 | Rosen | A43B 3/26 36/88 |
| 7,775,204 | B2 * | 8/2010 | Chen | A43B 7/02 126/204 |
| 9,996,981 | B1 * | 6/2018 | Tran | G06K 9/2018 |
| 10,282,914 | B1 * | 5/2019 | Tran | A61B 5/6898 |
| 2003/0069807 | A1 * | 4/2003 | Lyden | A43B 7/22 705/26.5 |
| 2005/0235527 | A1 * | 10/2005 | Perron, Jr. | A43B 5/02 36/107 |
| 2007/0003915 | A1 * | 1/2007 | Templeman | G06F 3/011 434/247 |
| 2010/0229422 | A1 * | 9/2010 | Goonetilleke | A43D 1/02 36/43 |

(Continued)

*Primary Examiner* — Aklilu K Woldemariam
(74) *Attorney, Agent, or Firm* — Ziegler IP Law Group, LLC

(57) ABSTRACT

A method for manufacturing an insole for a shoe. The method includes providing instructions to a person to attain a first pose; capturing a first three-dimensional image of a first foot of the person in the first pose; providing instructions to the person to attain a second pose, wherein the second pose is different from the first pose; capturing a second three-dimensional image of a second foot of the person in the second pose; generating a first three-dimensional model of the first foot from the first three-dimensional image; generating a second three-dimensional model of the second foot from the second three-dimensional model; manufacturing a first insole for the first foot based on the first three-dimensional model of the first foot; and manufacturing a second insole for the second foot based on the second three-dimensional model of the second foot.

26 Claims, 3 Drawing Sheets

(56) References Cited

U.S. PATENT DOCUMENTS

| | | | |
|---|---|---|---|
| 2014/0163664 A1* | 6/2014 | Goldsmith | A61B 17/12181 623/1.11 |
| 2014/0259800 A1* | 9/2014 | O'Reilly | A43B 7/1445 36/25 R |
| 2016/0295954 A1* | 10/2016 | Tran | A43B 19/00 |
| 2017/0127999 A1* | 5/2017 | Linders | A61B 5/0002 |
| 2017/0183469 A1* | 6/2017 | Falken | C08L 5/00 |
| 2017/0231320 A1* | 8/2017 | Nunez | A43B 17/14 36/93 |
| 2017/0249417 A1* | 8/2017 | Gosieski, Jr. | G06F 1/163 |
| 2017/0272728 A1* | 9/2017 | Rafii | H04N 13/246 |
| 2019/0096135 A1* | 3/2019 | Dal Mutto | G06T 7/50 |

* cited by examiner

METHOD FOR MANUFACTURING A CUSTOMIZED INSOLE AND A SYSTEM THEREFOR

TECHNICAL FIELD

The present disclosure relates generally to customized insoles; and more specifically, to methods for manufacturing an insole for a shoe. The present disclosure also relates to a system and apparatus for manufacturing an insole for a shoe.

BACKGROUND

A shoe insole or insole refers to an insert with a cushion layer which is fitted into a shoe. Insoles are widely used to provide support and comfort. Ready-made insoles do not generally provide a perfect match to anyone's foot, as people do not generally have identically shaped feet. Accordingly, many support insoles are ultimately deemed inconvenient due to a poor fit or for too soft support or too rigid.

To provide an optimized comfort to a specific foot, custom-made insoles have been developed. Custom insoles can be made by molding insoles using a person's feet. Customized insoles are a necessity for people who for example have a malposition of a foot or for people who are suffering from various medical conditions. Further customized insoles are used for a number of purposes, including daily wear comfort, height enhancement, plantar fasciitis treatment, arch support, foot and joint pain relief from arthritis, overuse, injuries, leg length discrepancy, and other causes such as orthopedic correction and athletic performance. These customized insoles are generally more comfortable than mass produced insoles that have been premade.

Conventionally, custom-made shoes and insoles are manufactured by professional shoemakers, physiotherapists, or podiatrists. Such conventional processes are time consuming and expensive, and require specialized apparatuses to manufacture customized insoles. Currently, the methods for making customized insoles require a person to stand on a molding material to obtain a shape of the feet, or require a person to stand on top of a scanner to obtain shape and size of the feet. Such current methods of shaping custom insoles and specifically capturing and processing the obtained shape of the foot to form a custom insole shape have numerous shortcomings. Such methods do not produce a reliable representation of feet. This is due to the deformation of the tissue or shape of the foot when the foot is pressed in the top of deformable (mold) material or scanner. Furthermore, if the deformable material is made from a less rigid material (e.g., softer), it will, on the other hand, result in inaccurate mold since the softer material does not maintain the form for a long time. Also, soft materials molds cannot be reused, making the process cumbersome if the person desires another set of insoles after a period of time. Furthermore, the conventional methods do not capture the true apex height of the arch of the feet of a person. An uninjured average human has approximately the same arch height on both right foot and left foot. However, this is mainly not the case, due to various reasons such as injuries to the lower limbs and back, in which both foot arches may have been compromised to some degree.

Therefore, in light of the foregoing discussion, there exists a need to overcome the drawbacks in methods for the manufacturing of customized insoles.

SUMMARY

The present disclosure seeks to provide a method for manufacturing an insole for a shoe. The present disclosure also seeks to provide a system and apparatus for manufacturing an insole for a shoe. The present disclosure seeks to provide a solution to the existing problem of unavailability of customized insoles for each of the feet of the person, thereby causing discomfort. An aim of the present disclosure is to provide a solution that overcomes at least partially the problems encountered in the prior art, and provides an inexpensive, accurate, and highly user-friendly method for manufacturing an insole for a shoe.

In one aspect, an embodiment of the present disclosure provides a method for manufacturing an insole for a shoe, the method comprising:
  providing instructions to a person to attain a first pose;
  capturing a first three-dimensional image of a first foot of the person in the first pose;
  providing instructions to the person to attain a second pose, wherein the second pose is different from the first pose;
  capturing a second three-dimensional image of a second foot of the person in the second pose;
  generating a first three-dimensional model of the first foot from the first three-dimensional image;
  generating a second three-dimensional model of the second foot from the second three-dimensional model;
  manufacturing a first insole for the first foot based on the first three-dimensional model of the first foot; and
  manufacturing a second insole for the second foot based on the second three-dimensional model of the second foot.

In another aspect, an embodiment of the present disclosure provides a system for manufacturing an insole for a shoe, the system comprising:
  an instructing device configured to provide instructions to a person to attain a first pose and a second pose, wherein the second pose is different from the first pose;
  an image capturing device configured to:
  capture a first three-dimensional image of a first foot of the person in the first pose; and
  capture a second three-dimensional image of a second foot of the person in the second pose; and
  a server arrangement communicatively coupled to the image capturing device, the server arrangement configured to:
  receive the first three-dimensional image and the second three-dimensional image from the image capturing device;
  generate a first three-dimensional model of the first foot from the first three-dimensional image; and
  generate a second three-dimensional model of the second foot from the second three-dimensional model.

Embodiments of the present disclosure substantially eliminate or at least partially address the aforementioned problems in the prior art, and provides an affordable, efficient, and accurate method for manufacturing an insole for a shoe.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
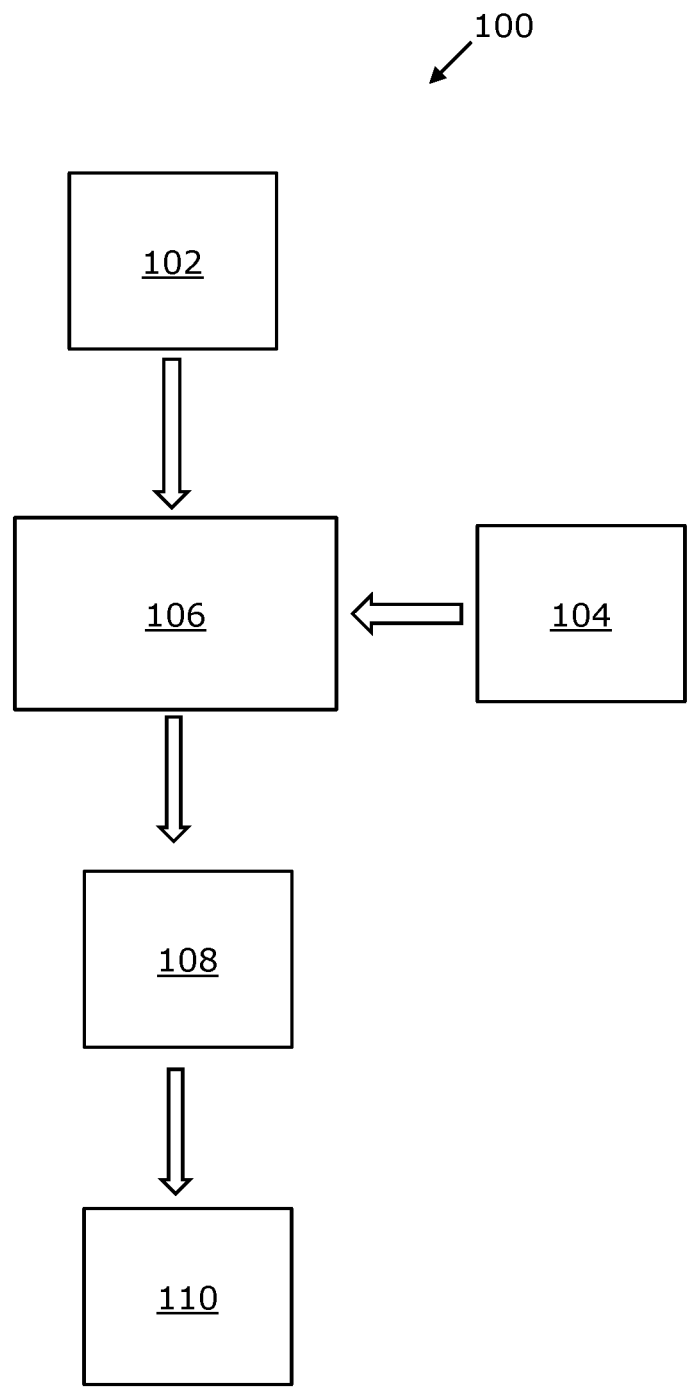
FIG. 1 is a block diagram of a system for manufacturing an insole for a shoe, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description, illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for manufacturing an insole for a shoe, the method comprising:
  providing instructions to a person to attain a first pose;
  capturing a first three-dimensional image of a first foot of the person in the first pose;
  providing instructions to the person to attain a second pose, wherein the second pose is different from the first pose;
  capturing a second three-dimensional image of a second foot of the person in the second pose;
  generating a first three-dimensional model of the first foot from the first three-dimensional image;
  generating a second three-dimensional model of the second foot from the second three-dimensional model;
  manufacturing a first insole for the first foot based on the first three-dimensional model of the first foot; and
  manufacturing a second insole for the second foot based on the second three-dimensional model of the second foot.

In another aspect, an embodiment of the present disclosure provides a system for manufacturing an insole for a shoe, the system comprising:
  an instructing device configured to provide instructions to a person to attain a first pose and a second pose, wherein the second pose is different from the first pose;
  an image capturing device configured to:
    capture a first three-dimensional image of a first foot of the person in the first pose; and
    capture a second three-dimensional image of a second foot of the person in the second pose; and
  a server arrangement communicatively coupled to the image capturing device, the server arrangement configured to:
    receive the first three-dimensional image and the second three-dimensional image from the image capturing device;
    generate a first three-dimensional model of the first foot from the first three-dimensional image; and
    generate a second three-dimensional model of the second foot from the second three-dimensional model.

The present disclosure provides a method for manufacturing an insole for a shoe. The present disclosure provides a method for manufacturing insoles for a shoe by scanning each of the first foot and the second foot using a camera to accurately capture contours of bottom surface of each of the first foot and the second foot, and thereby generate a first three-dimensional model and a second three-dimensional model of the first foot and the second foot, respectively. Notably, the present method may not be limited to the manufacturing of customized insoles. The present disclosure also provides a method for the manufacturing of customized shoes. The insoles and shoes are manufactured to be fully customized according to a shape and size of the feet of the person. The customized insole or customized shoe manufactured according to the present method may also be shaped to correct possible pronation problems, by scanning each of the feet with the toes-up position. This method allows the person to get a corrective insole fully customized to their foot shape. Furthermore, the present disclosure provides an inexpensive, user-friendly, and highly accurate method for manufacturing insoles for a shoe.

Throughout the disclosure the term "insole" as used herein refers to a piece of material that rests inside a shoe. The primary function of an insole is to provide a comfortable fit for the feet of the person wearing the shoes. Throughout the present disclosure the term "first pose" and "second pose" as used herein refers to a stance or position attained by a foot of the person. Notably, the first pose is different from the second pose. For the sake of simplicity, throughout the present disclosure the term "first pose" is used in conjunction with the first foot, and the term "second pose" is used in conjunction with the second foot. However, the terms used are only for reference, and do not limit the scope of the claims appended herein. It is to be understood that the terms "first" and "second" are only used to differentiate one pose from the other, or one foot from the other, and do not relate to any order or sequence of performing the method. Hereinafter, the "first foot" and the "second foot" are collectively referred to as "feet" or "foot" without any limitations.

According to an embodiment, at least one of the first pose and the second pose is a lunge pose. It will be appreciated that the lunge pose ensures that the contours of the bottom portion of the first foot are accurately exposed to be captured by the image capturing device. Notably, while the person is in the lunge pose, a contour of the longitudinal arch of the first foot and a contour of transverse arch of the first foot is accurately exposed for scanning, which is an essential factor in manufacturing the customized insole.

According to another embodiment, the at least one of the first pose and the second pose is any one of: heel strike pose, foot flat pose, stance pose, toe-off pose, swing pose.

In an alternative embodiment the first pose is a pose in which the first foot ("front foot") is straight, or flat on the ground surface and the second foot ("scanned foot") is back leaning on its toes. In the first pose the second foot, which is leaning back on its toes, has significantly less weight on it than the first foot, which is flat on the ground (for example 70-90% of the weight is carried by the second foot).

In the alternative embodiment the second pose is a pose in which the second foot ("new front foot" or previous "scanned foot") is straight or flat on the ground surface, and the first foot ("to be scanned new foot") is back leaning on its toes. In said the second pose the first foot, which is back leaning on its toes, has significantly less weight on it than the second foot, which is flat on the ground (for example 70-90% of the weight is carried by the first foot).

According to an embodiment the first pose and the second pose are selected to activate a windlass effect of the foot. The windlass effect raises the arch of the foot thus enabling more accurate capturing of an image of the first foot and the second foot respectively. The arch height increases, when the great toe dorsiflexes are pivoted, due to tightening of the plantar fascia.

Throughout the present disclosure the term "instructing device" as used herein refers to an electronic device configured to provide instructions to the person to attain the first pose and the second pose. Optionally, the instructing device may be an audio device, video device or an audio-video device configured to provide instructions to the person. Optionally, the instructing device may further comprise a memory configured to store the instructions related to the first pose and the second pose. The term "memory" as used herein refers to a volatile or persistent medium, such as an electrical circuit, magnetic disk, virtual memory or optical disk, in which the instructing device can store data or software for any duration. Optionally, the memory is non-volatile mass storage such as physical storage media.

Throughout the present disclosure the term "image capturing device" as used herein refers to an electronic device and/or an optical device configured to acquire images of an object. Herein, the image capturing devices refer to scanning devices that produce digital data in the form of a three-dimensional image representing an object or a scene in a real-world environment. Typically, the "image capturing devices" refer to a collection of one or more programmable and/or non-programmable components that are configured to capture data describing one or more features of a real-world object, herein one or more features of the feet of the person. The data describing one or more features of the foot refers to information that can be used to construct digital, three-dimensional models useful for customizing an insole in a number of ways.

In one embodiment, the image capturing device is a camera. For example, the image capturing device can be any one of: a rotatable camera, a time of flight camera, an infra-red camera and an optical camera. In one example the image capturing device is a smartphone camera configured to capture three-dimensional images. In another example, the image capturing device is a laser scanner for scanning the foot of the person. In laser scanning, the determination of the distance to the target, i.e. scanning, may happen using a time-of-flight technology, where the distance is measured by measuring the time of flight of the laser beam to the target and back. For small objects such as the foot, other technologies like phase or interference detection, triangulation and multiple-camera approaches may be used. In such technologies, the phase of modulated light may be used to measure the shape of the target, and/or the angle between the laser transmitter and the camera detecting the reflected laser may be used. In laser-based foot scanning, the imaging resolution is typically on the order of 1 mm. A plantar foot scanner based on a stereo imaging providing a 3D image with a 0.5 mm resolution may be used. For purposes of the present disclosure a resolution preferably below 3 mm should be used. Indeed, such resolution (or more accurate) is sufficient as long as keystone points of the foot remain accurate relative to each other during the process. The key stone points refer to heel apex, the center of the medial longitudinal arch or the highest point on the medial arch, the apex of the anterior transverse arch and point of contact with a floor when standing on the floor.

Optionally the instructing device and image capturing device can be the same physical device. In an example the instructions can be provided with a user interface of a smart phone and a camera of the smart phone can be used to capture the image of the feet.

In an additional or alternative embodiment, the instruction device can be used to provide instructions to correct the pose if the current pose is not as expected. This can be done for example using image analysis to find if the pose is as instructed or not.

Throughout the present disclosure the term "server arrangement" as used herein relates to a structure and/or module that include programmable and/or non-programmable components configured to store, process and/or share information. Optionally, the server arrangement includes any arrangement of physical or virtual computational entities capable of enhancing information to perform various computational tasks. Furthermore, it should be appreciated that the server arrangement may be both a single hardware server and/or a plurality of hardware servers operating in a parallel or distributed architecture. In an example, the server arrangement may include components such as memory, a processor, a network adapter and the like, to store, process and/or share information with other computing components, such as user device/user equipment. Optionally, the server arrangement is implemented as a computer program that provides various services (such as database service) to other devices, modules or apparatus. In one embodiment, the server arrangement comprise one or more processors that are configured to execute non-transitory machine readable instructions, which when executed, are configured to carry out aspects of the processes described herein.

The method comprises providing instructions to a person to attain a first pose. Specifically, the instructions are provided to the person using the instructing device. Throughout the present disclosure, the term "person" as used herein refers to a human being who desires a customized insole. In a further example the instructions can be provided to a trained person for the trained person to capture data from the person (for whom an insole is going to be made i.e. the disclosure provides a method for self-service and service).

In an example, the instructing device is configured to provide instructions in the form of an audio, describing a step by step process of attaining the first pose. In such an example, the instructing device is an audio output device such as a speaker. In another example, the instructing device is configured to provide instructions in the form of a video, presenting a step by step process to attain a first pose. In such an example, the instructing device is a display device such as an LCD display or an LED display. Optionally, the instructing device is configured to store information pertaining to the first pose and the second pose, and provide the stored information to the person, when in use. Optionally, the instructing device is configured to provide instructions to the person in real-time.

Optionally, the first pose is a lunge pose. In such a case, the person is instructed to attain the first pose by positioning the second foot forward with the knee bent, and by pressing the second foot flat on the ground. Further, the person is instructed to position the first foot behind (near the image capturing device), and placing toes of the first foot pressed against the ground, while the heel of the first foot is in the air, such that a mid-portion and a rear-portion of the first foot is exposed for scanning. It will be appreciated that the lunge pose ensures that the contours of the bottom portion of the first foot are accurately exposed to be captured by the image capturing device. Notably, while the person is in the lunge pose, a contour of the longitudinal arch of the first foot and a contour of transverse arch of the foot is accurately exposed for scanning, which is an essential factor in manufacturing the customized insole.

Further optionally the first pose is a pose ("toe-pose"/ "toe-off") in which the front leg is in a bent position and the first foot ("front foot") is straight or flat, typically on a surface such as the floor, and the second leg is straight back, with the second foot ("scanned foot") is leaning on its toes. The bottom of the second foot is up, away from the floor. In this first pose the second foot has significantly less weight on in than the first foot (for example 70-90% of the weight is carried by the second foot).

In the alternative embodiment the second pose is a pose, in which the leg of the second foot ("new front foot" or previous "scanned foot") is in a bent position and the bottom of the second foot is flat or straight on the floor. The leg of the first foot ("to be scanned new foot") is generally in a straightened position, with the first foot leaning on its toes. The sole or bottom of the first foot is in a raised and exposed position. In this second pose the first foot has significantly less weight on in than the second foot (for example 70-90% of the weight is carried by the first foot). Weight balancing in the above toe-pose is important in order to capture the images of the bottom of the feet properly.

Optionally, the method further comprises recording a first set of data relating to a stance of the first pose of the first foot attained by the person based on the provided instructions. In particular, the first set of data is recorded via at least one sensor communicatively coupled to the server arrangement. Herein, the at least one sensor refers to an electronic device arranged to sense a stance of the first pose of the first foot attained by the person by determining a distance of the first foot from the sensor, a heat signature of the first foot, an image of the first foot and so forth. Examples of at least one sensor include, but are not limited to: a proximity sensor, a heat signature sensor, a camera, and the like. Based on an example embodiment of recording a first set of data relating to a stance, the sensor is a weight measurement device which is used to measure a predefined division of weight between the first foot and the second foot. As an example for the "toe-pose" or "toe-off" a range between 60-95%, preferably 70-90% and more preferably 75-80%, of the weight of the person should be for the "front feet".

Optionally, the method further comprises comparing the first set of data with a predefined first set of data corresponding to the first pose. Herein, the predefined first set of data relates to a correct stance or position of the first pose corresponding to the first foot. Specifically, the server arrangement is configured to compare the first set of data with the predefined first set of data corresponding to the first pose. Notably, the first set of data and the predefined first set of data is compared to determine if the person has attained the correct first pose or not. It will be appreciated, that the perfection of the first pose ensures a high accuracy in manufacturing the customized insole.

Further, the server arrangement is configured to generate corrective instructions for the person, if the first set of data does not match with the predefined first set of data. Further, the method comprises providing the corrective instructions to the person. Herein, the corrective instructions are provided to the person via the instructing device. In an exemplary implementation, the person attains the first pose based on the instructions provided by the instructing device and the at least one sensor records data corresponding to the first pose. Further, the instructing device is configured to provide corrective instructions to the person, if the first pose attained by the person is not correct.

In an example, if while making the lunge pose, the mid-portion and the rear-portion of the first pose is not accurately exposed, then the corrective instructions are generated to lift the heel of the first foot higher, in order to attain the correct first pose. In another example, if while making the first pose, the front-portion of the first foot is not in contact with the ground, then the corrective instructions are generated to place the front-portion on the ground, in order to attain the correct first pose.

Further, the method comprises capturing a first three-dimensional image of a first foot of the person in the first pose. Specifically, the image capturing device is configured to capture the first three-dimensional image of the first foot of the person in the first pose. Herein, the term "first three-dimensional image" refers to a volumetric image (namely, an image having a height, a width, and a depth in the three-dimensional space), representing contours of the bottom surface of the first foot. In particular, the "first three-dimensional image" can be understood as a collection of a plurality of spatial coordinates in a digital form representing the bottom surface of the first foot.

Optionally, the image capturing device is arranged at a position to scan a bottom surface of the first foot, and thereby capturing the first three-dimensional image. Notably, the image capturing device is configured to scan the mid-portion and the rear-portion of the first foot in order to capture the first three-dimensional image. Optionally, the image capturing device is arranged on a ground plane on which the person attains the first pose. In an example, the image capturing device is rotatably arranged on the ground plane, such that the image capturing device is configured to rotate in a range of 0 degrees to 180 degrees, accurately scanning the first foot. Optionally, the image capturing device is configured to capture multiple images of the first foot from different angles and positions, which can be digitally correlated or mapped with one another in order to obtain the first three-dimensional image.

Further, the method comprises providing instructions to the person to attain a second pose, wherein the second pose is different from the first pose. Specifically, the instructions are provided to the person using the instructing device. As aforementioned, the instructing device is configured to provide instructions in the form of an audio, describing a step by step process of attaining the second pose. In such an example, the instructing device is an audio output device such as a speaker. In another example, the instructing device is configured to provide instructions in the form of a video, presenting a step by step process to attain the second pose. In such an example, the instructing device is a display device such as an LCD display, an LED display. Optionally, the instructing device is configured to store information pertaining to the second pose, and provide the stored information to the person, when in use. Optionally, the instructing device is configured to provide instructions to the person in real-time.

Optionally, the second pose is a lunge pose. In such a case, the person is instructed to attain the second pose by positioning the first foot forward with the knee bent, and by pressing the first foot flat on the ground. Further, the person is instructed to position the second foot behind (near the image capturing device), and place toes of the second foot pressed against the ground, while the heel of the second foot is in the air, such that a mid-portion and a rear-portion of the second foot is exposed for scanning. It will be appreciated that the lunge pose ensures that the contours of the bottom portion of the second foot are accurately exposed to be captured by the image capturing device. Notably, while the person is in the lunge pose, a contour of the longitudinal arch of the second foot and a contour of transverse arch of the foot is accurately exposed for scanning, which is an essential factor in manufacturing the customized insole according to the aspects of the disclosed embodiments.

Optionally, the method further comprises recording a second set of data relating to a stance of the second pose of the second foot attained by the person based on the provided instructions. In particular, the second set of data is recorded via at least one sensor communicatively coupled to the server arrangement. Herein, the at least one sensor refers to an electronic device arranged to sense a stance of the first pose of the second foot attained by the person by determining one or more of a distance of the second foot from the sensor, a heat signature of the second foot, an image of the second foot, and a pressure or weight exerted by the second foot on the floor or sensor. According to the additional embodiment the first set of data is a first weight distribution between the first foot and the second foot, and the second set of data is a second weight distribution between the second foot and the first foot. In the additional embodiment the sensor is a weight measurement sensor. The weight distribution refers to how many % of the total weight of the person using the system is on each foot.

Optionally, the method further comprises comparing the second set of data with a predefined second set of data corresponding to the second pose. Herein, the predefined second set of data relates to a correct stance or position of the second pose corresponding to the second foot. Specifically, the server arrangement is configured to compare the second set of data with the predefined second set of data corresponding to the second pose. Notably, the second set of data and the predefined second set of data is compared to determine if the person has attained the correct second pose or not. It will be appreciated, that a perfection of the second pose ensures a high accuracy in manufacturing the customized insole. Further, the server arrangement is configured to generate corrective instructions for the person, if the second set of data does not match with the predefined second set of data. Further, the method comprises providing the corrective instructions to the person. Herein, the corrective instructions are provided to the person via the instructing device. In an exemplary implementation, the person attains the second pose based on the instructions provided by the instructing device and the at least one sensor records data corresponding to the second pose. Further, the instructing device is configured to provide corrective instructions to the person, if the second pose attained by the person is not correct. In an example, if while making the lunge pose, the mid-portion and the rear-portion of the second foot is not accurately exposed, then the corrective instructions are generated to lift the heel of the second foot higher, in order to attain the correct second pose. In another example, if while making the second pose, the front-portion of the second foot is not in contact with the ground, then the corrective instructions are generated to place the front-portion on the ground, in order to attain the correct second pose. In another example, if while making the toe-pose, the corrective instructions can relate to adding more weight to the front foot in comparison to the rear or back foot which being scanned.

Further, the method comprises capturing a second three-dimensional image of the second foot of the person in the second pose. Specifically, the image capturing device is configured to capture the second three-dimensional image of the second foot of the person in the second pose. Herein, the term "second three-dimensional image" refers to a volumetric image (namely, an image having a height, a width, and a depth in the three-dimensional space), representing contours of the bottom surface of the second foot. In particular, the "second three-dimensional image" can be understood as a collection of a plurality of spatial coordinates in digital form representing the bottom surface of the second foot.

Optionally, the image capturing device is arranged at a position to scan a bottom surface of the second foot, and thereby capturing the second three-dimensional image. Notably, the image capturing device is configured to scan the mid-portion and the rear-portion of the second foot in order to capture the second three-dimensional image. Optionally, the image capturing device is arranged on a ground plane on which the person attains the second pose. In an example, the image capturing device is rotatably arranged on the ground plane, such that the image capturing device is configured to rotate in a range of 0 degrees to 180 degrees, accurately scanning the second foot. Optionally, the image capturing device is configured to capture multiple images of the second foot from different angles and positions, which can be digitally correlated or mapped with one another in order to obtain the second three-dimensional image.

Further, the method comprises generating a first three-dimensional model of the first foot from the first three-dimensional image. The method also comprises generating a second three-dimensional model of the second foot from the second three-dimensional model. Specifically, the server arrangement is configured to generate the first three-dimensional model and the second three-dimensional model. Herein, the server arrangement is configured to receive the first three-dimensional image and the second three-dimensional image from the image capturing device and further process the first three-dimensional image and the second three-dimensional image. Optionally, the server arrangement comprises dedicated image processing units to process the first three-dimensional image and the second three-dimensional image to generate a first three-dimensional model and the second three-dimensional model. In an example, the server arrangement is a computing device that includes a processor configured to process the scanned image. The processor may have a configuration based on, for example, an advanced RISC machine (ARM) microcontroller and Intel Corporation's microprocessors (e.g., the Pentium, Atom, Celeron or Core families of microprocessors). In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/8/Vista/2000/9x/ME/XP, Macintosh OS (10), OS/2, Android, iOS and the like. The server arrangement can be any computing device, including but not limited to, a desktop computer, a laptop computer, a tablet computer, a smartphone, a personal digital assistant or any other computing device that can wirelessly or connectedly communicate data with the image capturing device and the printing device.

Herein, the term "three-dimensional model" as used in the "first three-dimensional model" and the "second three-dimensional model" refers to a processed image as obtained after applying image processing techniques on the three-dimensional image obtained from the image capturing device.

Optionally, the server arrangement may further comprise a user interface for presenting the generated three-dimensional image to an operator of the system. Herein, the operator may be the person for whom the insole is customized or any other person such as a vendor or shopkeeper who provides the customized insoles to the person. The user interface provides several options to allow the operator to view, modify, delete, save, process, enhance the three-dimensional model as generated. The term "user interface" as used herein refers to a structured set of user interface elements rendered on a display screen. Optionally, the user interface (UI) rendered on the display screen is generated by any collection or set of instructions executable by an associated digital system. Additionally, the user interface (UI) is operable to interact with the user to convey graphical and/or textual information and receive input from the user. Specifically, the user interface (UI) used herein is a graphical user interface (GUI). Furthermore, the user interface (UI) elements refer to visual objects that have a size and position in the user interface (UI). A user interface element may be visible, though there may be times when a user interface element is hidden. A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like.

Further, the method comprises manufacturing a first insole for the first foot based on the first three-dimensional model of the first foot. The method also comprises manufacturing a second insole for the second foot based on the second three-dimensional model of the second foot. Notably, the first insole is manufactured to be of substantially the same size and same shape as the first three-dimensional model, and the second insole is manufactured to be of substantially the same size and same shape as the second three-dimensional model. Optionally, manufacturing the first insole and the second insole further comprises printing a first insole for the first foot, corresponding to the first three-dimensional model, and printing a second insole for the second foot, corresponding to the second three-dimensional model. In one embodiment a person, such as a trained person or other operator of the system can edit the model to achieve a predetermined goal. The predetermined goal can include for example, but is not limited to having lower arches or higher arches, or adding transverse arch supports.

Optionally, the first insole and the second insole are manufactured using the printing device. Optionally, manufacturing the first insole and the second insole comprises printing a first mold, a second mold, a third mold and a fourth mold. In particular, the printing device is configured to print the first mold, the second mold, the third mold and the fourth mold. Hereinafter, for simplicity and clarity, the first mold, the second mold, the third mold and the fourth mold can be collectively referred to as "molds" without any limitations.

Throughout the present disclosure the term "printing device" as used herein refers to an electronic device configured to print three-dimensional objects when information relating the same is provided to the printing device. Optionally, the printing device is a 3D printer configured to print one or more insoles or one or more molds based on the three-dimensional model generated by the server arrangement. Optionally, the printing device is communicatively coupled to the server arrangement and is configured to receive the first three-dimensional model and the second three-dimensional model from the server arrangement. The one or more insoles and/or one or more molds are printed form a printing material based on the three-dimensional model. In an example, the 3D printers are arranged in different geographical locations, for instance in different shoe centers. The 3D printers may be configured to print insoles and molds multiple times as and when required by the person, however capturing the three-dimensional image of each of the foot of the person one time.

The term "molds" as used herein refers to a structure or model corresponding to the three-dimensional model that is used to shape non-molded insoles in order to produce customized insoles. The molds may be printed using a hard material that does not have a tendency to bend or fold when a minimum pressure is applied onto the molds. In an example, the molds are printed from a metal such as aluminium. Optionally, manufacturing the first insole and the second insole further comprises printing the first mold having a depression corresponding to a curvature of a longitudinal arch and a transverse arch of the first foot, captured in the first three-dimensional model. Further, the method comprises printing the second mold having a protrusion corresponding to the curvature of the longitudinal arch and the transverse arch of the first foot, captured in the first three-dimensional model. Further, the method comprises printing the third mold having a depression corresponding to a curvature of a longitudinal arch and a transverse arch of the second foot, captured in the second three-dimensional model. Further, the method comprises printing the fourth mold having a protrusion corresponding to the curvature of the longitudinal arch and the transverse arch of the second foot, captured in the second three-dimensional model. According to an alternative embodiment the method comprises printing the first mold and the second mold as a first single object i.e. the first mold and the second mold might be forming the first single mold. Furthermore the method comprises printing the third mold and the fourth mold as a second single object i.e. the third mold and the fourth mold might be forming the second single mold.

Optionally, the method further comprises aligning a first non-molded insole having a first surface and a second surface between the first mold and the second mold, such that the protrusion of the second mold is facing towards the first surface of the first non-molded insole and the depression of the first mold is facing towards the second surface of the first non-molded insole. Optionally, the method further comprises aligning a second non-molded insole having a first surface and a second surface between the third mold and the fourth mold, such that the protrusion of the fourth mold is facing towards the first surface of the second non-molded insole and the depression of the third mold is facing towards the second surface of the second non-molded insole. According to an alternative embodiment only a first (or second) mold having depressions (or protrusions) might be used. In such an example the second (first) mold can be considered to be a flat object which is used to press the non-molded insole between the flat object and the first (second) mold.

Herein the term "non-molded insole" as used in the "first non-molded insole" and the "second non-molded insole" refers to a piece of material that is not molded or applied pressure thereupon. In particular, the non-molded insole is flat in shape.

Further, the method comprises applying predetermined pressure on at least one of the first mold and the second mold to shape the first non-molded insole to produce a first insole for the first foot. Optionally, the method comprises applying predetermined pressure on at least one of the third mold and the fourth mold to shape the second non-molded insole to produce a second insole for the second foot. Optionally, a casting apparatus is configured to shape the first non-molded insole and the second non-molded insole to produce the first insole for the first foot, and the second insole for the second foot respectively. Optionally, the casting apparatus is further configured to heat the first non-molded insole and the second non-molded insole at a temperature in the range of 96° Celsius to 210° Celsius, preferably in the range of 100° Celsius to 170° Celsius and more preferably in the range of 120° Celsius to 140° Celsius. It will be appreciated that a person skilled in the art will understand that several systems and methods exist for shaping the first non-molded insole and the second non-molded insole using the casting apparatus, and therefore the method described herein shaping the first non-molded insole and the second non-molded insole should not limit the scope of the appended claims.

Additional Embodiments

Additionally, in another aspect, an alternative embodiment of the present disclosure provides an apparatus for manufacturing a customized insole for a shoe, the apparatus comprising:
a processor;
a sensor coupled to the processor, the sensor configured to detect an elevation between a heel of a first foot and a ground plane; and
an image capture device connected to the processor; wherein the processor is configured to:
detect an elevation between the heel of the first foot and the ground plane;
determine a first pose of the first foot based on the detected elevation by the sensor, and, if the first foot is in the first pose;
capture a first image of a sole of the first foot in the first pose;
generate a three-dimensional model of the sole of the first foot in the first pose; and
map the generated three-dimensional model of the sole to a model of an insole for creating the insole.

Indeed based on the alternative embodiment the sensor such as image sensor can be used to detect elevation between the heel and the ground plane. If the elevation is sufficient then the pose can be deemed to be proper. The proper pose is needed to capture, such a image of a sole (bottom of the foot) of the first foot, which captures sufficient information to generate the three-dimensional model. If toes are not tilted sufficiently the form of the sole is not properly captured.

Further, the processor is configured to determine the first pose by:
comparing the detected elevation to a pre-determined elevation;
comparing a toe position of the first foot to a pre-determined toe position; and
determining that the detected elevation and the toe position are within a pre-determined range of the pre-determined elevation and the pre-determined toe position.

Optionally, the processor is further configured to determine the first pose by:
detecting a position of a second foot; and
determining that the second foot is flat on the ground plane.

Further, the image capture device is configured to scan the sole of the foot and capture contours of the sole of the foot. Additionally, the image capture device may be configured to scan a contour of a longitudinal arch of the first foot and a contour of a transverse arch of the first foot.

The processor is further configured to cause a printing of the insole to create the insole based on the model of the insole. Optionally, the processor may be configured to generate at least a first mold for the insole to be created based on the model of the insole.

In a further alternative embodiment the processor is configured to cause a printing of a first mold for the insole to be created based on the model of the insole by generating a depression corresponding to a curvature of a longitudinal arch of the first foot and a transverse arch of the first foot captured by the first three-dimensional model.

In another alternative embodiment the processor is further configured to:
record a first set of data relating to a position of the heel relative to the ground plane;
record a second set of data relating to the detected toe position;
compare the first set of data and the second set of data to a pre-determined set of data; and
generate an instruction to change one or more of the positions of the heel or the toe position when one or more of the first set of data and the second set of data does not match the pre-determined set of data.

Optionally, the processor may be further configured to provide a notification when the first foot is not in the first pose.

Alternatively, the processor may be configured to cause an insole manufacturing device to create the insole using the model of the insole.

The alternative embodiments enable to generate three-dimensional model of the sole to a model of an insole for creating the insole of a shoe for a person in different heel up on-toe positions (for example in lunge, standing on tiptoe, having a one or both leg toe stand, having a one or both leg plank, having a one or both knee pose, having one knee on the floor plank pose, leaning on the support or having other heel up on-toe pose with one or both feet at the same time or alternately) of the person.

DETAILED DESCRIPTION OF THE DRAWINGS

Referring to FIG. 1, illustrated is a schematic illustration of an exemplary environment a system 100 for manufacturing an insole for a shoe, in accordance with an embodiment of the present disclosure. As shown, the system 100 for manufacturing an insole for a shoe comprises an instructing device 102, an image capturing device 104, and a server arrangement 106 communicatively coupled to the image capturing device 104. Herein, the instructing device 102 is communicatively coupled to the server arrangement 106. Further, the system 100 comprises a printing device 108 communicatively coupled to the server arrangement 106, and a casting apparatus 110 communicatively coupled to the printing device 108.

FIG. 1 is merely an example, which should not unduly limit the scope of the claims herein. It is to be understood that the specific designation for the system 100 is provided as an example and is not to be construed as limiting the system 100 to specific numbers of server arrangements, image capturing devices, instructing devices, printing devices and casting apparatuses. A person skilled in the art will recognize many variations, alternatives, and modifications of embodiments of the present disclosure.

Figure 2:
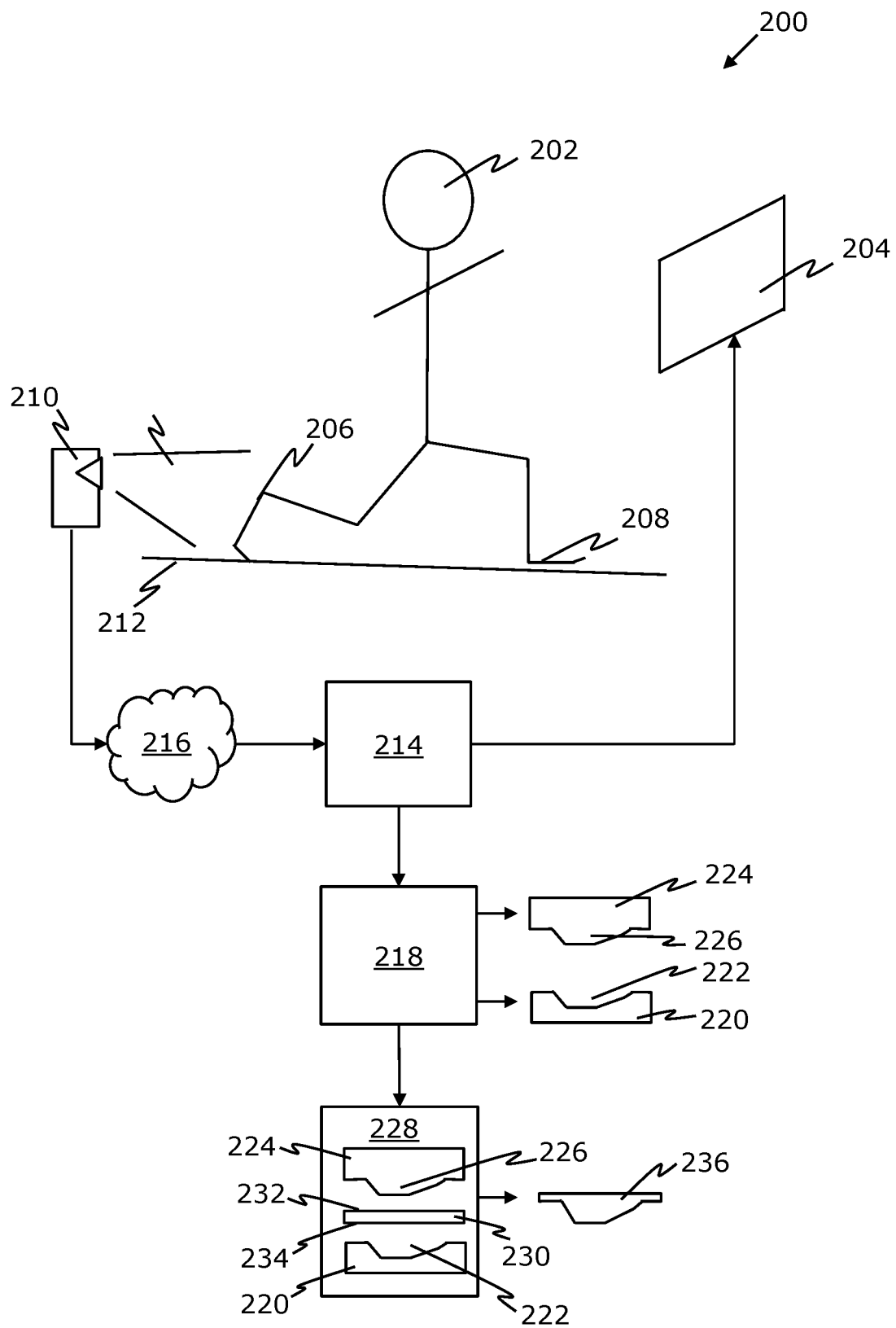
FIG. 2 is a schematic illustration of an exemplary environment for operation of a system (such as the system of FIG. 1) for manufacturing an insole for a shoe, in accordance with an embodiment of the present disclosure.

Referring to FIG. 2, illustrated is a schematic illustration of an exemplary environment of a system 200 (such as the system 100 of FIG. 1), in accordance with an embodiment of the present disclosure. There is shown a person 202 attaining a first pose based on the instructions provided by the instructing device 204. Herein, the first pose is a lunge. In the lunge position one foot is in a rearward or back position, while the other foot is in a forward or front position. In the example of FIG. 2 the first or back foot 206 of the person 202 is positioned behind a second or front foot 208, and the bottom portion of the first foot 206 is exposed to the image capturing device 210. In particular, toes of the first foot 206 are pressed against ground 212, while the heel of the first foot 206 is in an upwards position, or in the air, away from the floor or another surface. In this position of the first or back foot 206, a mid-portion a rear-portion of the first foot 206 is exposed to the image capturing device 210 for scanning. Further, the second or front foot 208 is placed flat on the ground 212.

As shown, the image capturing device 210 is arranged above the ground 212 such that the first foot 206 is in the field view 216 of the image capturing device 210. Further, the image capturing device 210 is configured to capture a first three-dimensional image of the first foot 206, and transmit the first three-dimensional image to a server arrangement 214 over a communication network 216. The server arrangement 214 is configured to generate a first three-dimensional model from the first three-dimensional image and transmit the three-dimensional model to a printing device 218 over the communication network 216. The printing device 218 is configured to print a first mold 220 having a depression 222 corresponding to a curvature of a longitudinal arch and a transverse arch of the first foot as generated in the first three-dimensional model. Further, the printing device 218 is configured to print a second mold 224 having a protrusion 226 corresponding to the curvature of the longitudinal arch and the transverse arch of the first foot as generated the first three-dimensional model.

As shown, the system 200 further comprises a casting apparatus 228 configured to align a first non-molded insole 230 having a first surface 232 and a second surface 234 between the first mold 220 and the second mold 224, such that the protrusion 226 of the second mold 224 is facing towards the first surface 232 of the first non-molded insole 230 and the depression 222 of the first mold 220 is facing towards the second surface 234 of the first non-molded insole 230. Further, as shown, the casting apparatus 228 produces a first insole 236 by shaping the first non-molded insole 230 on applying predetermined pressure on the first mold 220 and the second mold 224.

Figure 3:
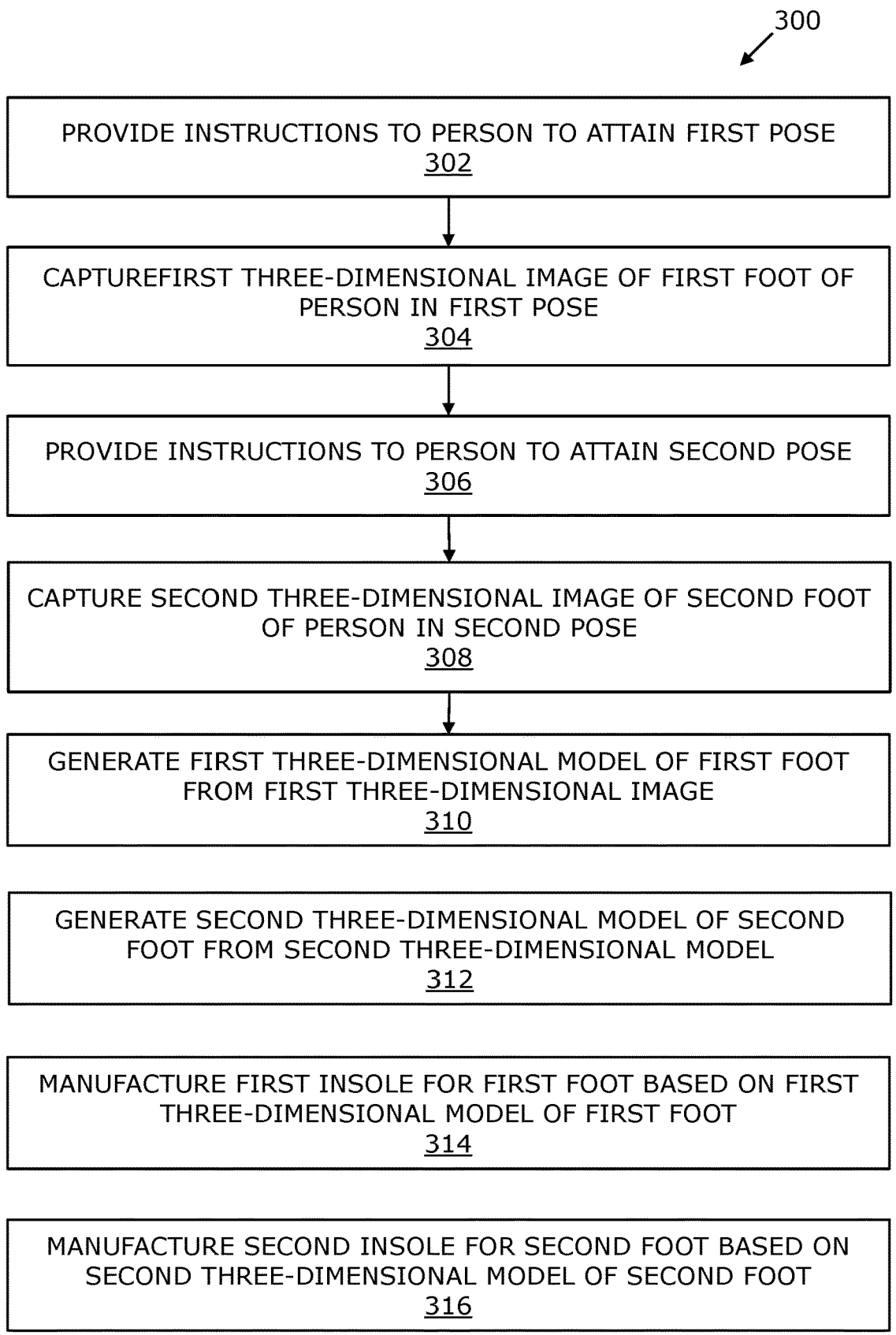
FIG. 3 is a flowchart depicting steps of a method for manufacturing an insole for a shoe, in accordance with an embodiment of the present disclosure.

Referring to FIG. 3, illustrated is a flowchart 300 depicting steps of a method for creating a model for a customized insole for a shoe and manufacturing an insole for the shoe using the model, in accordance with an embodiment of the present disclosure. While the flow chart is presented as a series of steps, one or more steps of the flowchart may be omitted or varied without departing from the aspects of the present disclosure. At step 302, instructions are provided to a person to attain a first pose. At step 304, a first three-dimensional image of a first foot of the person is captured in the first pose. At step 306, instructions are provided to the person to attain a second pose. At step 308, a second three-dimensional image of a second foot of the person is captured in the second pose. At 310, a first three-dimensional model of the first foot is generated from the first three-dimensional image. At step 312, a second three-dimensional model of the second foot is generated from the second three-dimensional model. At step 314, a first insole for the first foot is manufactured based on the first three-dimensional model of the first foot. At step 316, a second insole for the second foot is manufactured based on the second three-dimensional model of the second foot.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for manufacturing an insole for a shoe, the method comprising:
   providing instructions to a person to attain a first pose;
   capturing a first three-dimensional image of first foot of the person in the first pose;
   providing instructions to the person to attain a second pose, wherein the second pose is different from the first pose;
   capturing a second three-dimensional image of a second foot of the person in the second pose;
   generating a first three-dimensional model of the first foot from the first three-dimensional image;
   generating a second three-dimensional model of the second foot from the second three-dimensional model;
   manufacturing a first insole for the first foot based on the first three-dimensional model of the first foot; and
   manufacturing a second insole for the second foot based on the second three-dimensional model of the second foot;
   wherein manufacturing the first insole and the second insole comprises:
      printing a first mold having a depression corresponding to a curvature of a longitudinal arch and a transverse arch of the first foot, captured in the first three-dimensional model;
      printing a second mold having a protrusion corresponding to the curvature of the longitudinal arch and the transverse arch of the first foot, captured in the first three-dimensional model
      printing a third mold having a depression corresponding to a curvature of a longitudinal arch and a transverse arch of the second foot, captured in the second three-dimensional model; and
      printing a fourth mold having a protrusion corresponding to the curvature of the longitudinal arch and the transverse arch of the second foot, captured in the second three-dimensional model.

2. The method according to claim 1, further comprising:
aligning a first non-molded insole having a first surface and a second surface between the first mold and the second mold, such that the protrusion of the second mold is facing towards the first surface of the first non-molded insole and the depression of the first mold is facing towards the second surface of the first non-molded insole;
applying predetermined pressure on at least one of the first mold and the second mold to shape the first non-molded insole to produce a first insole for the first foot;
aligning a second non-molded insole having a first surface and a second surface between the third mold and the fourth mold, such that the protrusion of the fourth mold is facing towards the first surface of the second non-molded insole and the depression of the third mold is facing towards the second surface of the second non-molded insole; and
applying predetermined pressure on at least one of the third mold and the fourth mold to shape the second non-molded insole to produce a second insole for the second foot.

3. The method according to claim 2, further comprising heating the first non-molded insole and the second non-molded insole at a temperature in the range of 96° Celsius to 210° Celsius.

4. The method according to claim 1, wherein manufacturing the first insole and the second insole further comprises:
printing a first insole for the first foot, corresponding to the first three-dimensional model; and
printing a second insole for the second foot, corresponding to the second three-dimensional model.

5. The method according to claim 1, further comprising:
recording a first set of data relating to a stance of the first pose of the first foot attained by the person based on the provided instructions; and
recording a second set of data relating to a stance of the second pose of the second foot attained by the person based on the provided instructions.

6. The method according to claim 5, further comprising:
comparing the first set of data with a predefined first set of data corresponding to the first pose;
comparing the second set of data with a predefined second set of data corresponding to the second pose;
generating corrective instructions for the person, if the first set of data and the second set of data does not match with the predefined first set of data and the predefined second set of data, respectively; and
providing the corrective instructions to the person.

7. The method according to claim 5, wherein the first set of data is a first weight distribution between the first foot and the second foot, and the second set of data is a second weight distribution between the second foot and the first foot.

8. The method according to claim 1, wherein the second pose is a lunge pose.

9. The method according to claim 1, wherein the second pose is one of: a heel strike pose, a foot flat pose, a stance pose, a toe-off pose, a swing pose, a toe-pose.

10. The method according to claim 1, wherein the first three-dimensional image and the second three-dimensional image are captured using any one of: a rotatable camera, a time of flight camera, an infra-red camera and an optical camera.

11. A system for manufacturing an insole for a shoe, the system comprising:
an instructing device configured to provide instructions to a person to attain a first pose and a second pose, wherein the second pose is different from the first pose;
an image capturing device configured to:
capture a first three-dimensional image of a first foot of the person in the first pose; and
capture a second three-dimensional image of a second foot of the person in the second pose; and
a server arrangement communicatively coupled to the image capturing device, the server arrangement configured to:
receive the first three-dimensional image and the second three-dimensional image from the image capturing device;
generate a first three-dimensional model of the first foot from the first three-dimensional image; and
generate a second three-dimensional model of the second foot from the second three-dimensional model;
a printing device communicatively coupled to the server arrangement, the printing device configured to:
print a first mold having a depression corresponding to a curvature of a longitudinal arch and a transverse arch of the first foot, captured in the first three-dimensional model;
print a second mold having a protrusion corresponding to the curvature of the longitudinal arch and the transverse arch of the first foot, captured in the first three-dimensional model;
print a third mold having a depression corresponding to a curvature of a longitudinal arch and a transverse arch of the second foot, captured in the second three-dimensional model; and
print a fourth mold having a protrusion corresponding to the curvature of the longitudinal arch and the transverse arch of the second foot, captured in the second three-dimensional model.

12. The system according to claim 11, further comprising a casting apparatus configured to:
align a first non-molded insole having a first surface and a second surface between the first mold and the second mold, such that the protrusion of the second mold is facing towards the first surface of the first non-molded insole and the depression of the first mold is facing towards the second surface of the first non-molded insole;
apply predetermined pressure on at least one of the first mold and the second mold to shape the first non-molded insole to produce a first insole for the first foot;
align a second non-molded insole having a first surface and a second surface between the third mold and the fourth mold, such that the protrusion of the fourth mold is facing towards the first surface of the second non-molded insole and the depression of the third mold is facing towards the second surface of the second non-molded insole; and
apply predetermined pressure on at least one of the third mold and the fourth mold to shape the second non-molded insole to produce a second insole for the second foot.

13. The system according to claim 12, wherein the casting apparatus is further configured to heat the first non-molded insole and the second non-molded insole at a temperature in the range of 120° Celsius to 140° Celsius.

14. The system according to claim 11, further comprising a printing device communicatively coupled to the server arrangement, the printing device configured to:
- print a first insole for the first foot, corresponding to the first three-dimensional model; and
- print a second insole for the second foot corresponding, to the second three-dimensional model.

15. The system according to claim 11, wherein the printing device is a 3D printer.

16. The system according to claim 11, further comprising at least one sensor communicatively coupled to the server arrangement, the at least one sensor configured to:
- record a first set of data relating to a stance of the first pose of the first foot attained by the person based on the instructions provided by the instructing device; and
- record a second set of data relating to a stance of the second pose of the second foot attained by the person based on the instructions provided by the instructing device.

17. The system according to claim 16, wherein the server arrangement is further configured to:
- receive the first set of data and the second set of data from the at least one sensor;
- compare the first set of data with a predefined first set of data corresponding to the first pose;
- compare the second set of data with a predefined second set of data corresponding to the second pose; and
- generate corrective instructions for the person, if the first set of data and the second set of data does not match with the predefined first set of data and the predefined second set of data, respectively.

18. The system according to claim 16, wherein the first set of data is a first weight distribution between the first foot and the second foot, and the second set of data is a second weight distribution between the second foot and the first foot and the at least one sensor is a weight measurement sensor.

19. The system according to claim 17, wherein the instructing device is further configured to:
- receive corrective instructions from the server arrangement; and
- provide the corrective instructions to the person.

20. The system according to claim 11, wherein the second pose is one of a lunge pose, a heel strike pose, a foot flat pose, a stance pose, a toe-off pose or a swing pose.

21. The system according to claim 11, wherein the image capturing device is any one of: a rotatable camera, a time of flight camera, an infra-red camera and an optical camera.

22. The system according to claim 11, wherein the first mold and the second mold are printed as a first single object and the third mold and the fourth mold are printed as a second single object.

23. An apparatus comprising:
- a processor;
- a sensor coupled to the processor, the sensor configured to detect an elevation between a heel of a first foot and a ground plane; and
- an image capture device connected to the processor;
wherein the processor is configured to:
- detect an elevation between a heel of a first foot and a ground plane
- determine a first pose of the first foot based on the detected elevation by the sensor, and, if the first foot is in the first pose;
- capture a first image of a sole of the first foot in the first pose;
- generate a three-dimensional model of the sole of the first foot in the first pose; and
- map the generated three-dimensional model of the sole to a model of an insole for creating the insole, wherein creating the insole comprises:
  - printing a first mold having a depression corresponding to a curvature of a longitudinal arch and a transverse arch of the first foot, generated in the three-dimensional model; and
  - printing a second mold having a protrusion corresponding to the curvature of the longitudinal arch and the transverse arch of the first foot, generated in the three-dimensional model.

24. The apparatus according to claim 23, wherein the processor is configured to determine the first pose by:
- comparing the detected elevation to a pre-determined elevation;
- comparing a toe position of the first foot to a pre-determined toe position; and
- determining that the detected elevation and the toe position are within a pre-determined range of the pre-determined elevation and the pre-determined toe position.

25. The apparatus according to claim 23, wherein the imaging capture device is configured to scan the sole of the foot and capture contours of the sole of the foot.

26. The apparatus according to claim 23, wherein the processor is configured to cause a printing of the insole based on the first mold and the second mold.

* * * * *